United States Patent [19]

Nakamura et al.

[11] 4,031,276

[45] June 21, 1977

[54] PREPARATION OF DENSIFIED WOOD IMPREGNATED WITH PHENOLIC RESINS

[75] Inventors: Nobutaka Nakamura; Yukio Saeki, both of Fujieda, Japan

[73] Assignee: Sumitomo Durez Company, Ltd., Tokyo, Japan

[22] Filed: July 21, 1975

[21] Appl. No.: 597,618

[30] Foreign Application Priority Data

July 24, 1974 Japan .............................. 49-84225

[52] U.S. Cl. ............................. 427/369; 427/393; 427/440

[51] Int. Cl.$^2$ ..................... B05D 3/12; B05D 3/02; B05D 1/18

[58] Field of Search .......... 427/369, 370, 393, 440; 260/51.5

[56] References Cited

UNITED STATES PATENTS

| | | |
|---|---|---|
| 2,983,629 | 5/1961 | Anderson ....................... 427/393 X |
| 3,428,477 | 2/1969 | Hallonquist et al. .......... 427/370 X |
| 3,493,417 | 2/1970 | Moren et al. ................... 427/393 X |
| 3,519,468 | 7/1970 | Brown et al. ................... 427/393 X |
| 3,519,476 | 7/1970 | Bremmer et al. ............... 427/393 X |
| 3,563,788 | 2/1971 | Brown et al. ................... 427/393 X |
| 3,637,429 | 1/1972 | Anderson et al. .............. 427/391 X |

*Primary Examiner*—Michael R. Lusignan
*Attorney, Agent, or Firm*—Peter F. Casella; Howard M. Ellis; William G. Gosz

[57] ABSTRACT

Improved preparation of densified wood reinforced with a resole phenolic resin is accomplished by impregnating wood with a solution of the resin in the presence of about 0.6 to 4 parts of methanol, acetone, or mixture thereof per part by weight of the solids content of the resin under a pressure of about 10–50 Kgs/cm$^2$ and thereafter drying and curing the resin-impregnated wood. The resultant product has an enhanced content of cured resin and greater bending strength than densified wood prepared by conventional resin impregnating techniques.

10 Claims, No Drawings

PREPARATION OF DENSIFIED WOOD IMPREGNATED WITH PHENOLIC RESINS

BACKGROUND OF THE INVENTION

The present invention relates to a method of preparing densified wood impregnated with phenolic resin. More particularly, it relates to an improved method of preparing densified wood having a high phenolic resin content and a high mechanical strength by impregnating and reinforcing the wood with a phenolic resin solution obtained by blending about 0.6 to about 4 parts by weight of methanol, acetone, or a mixture of methanol and acetone per part by weight of the solid content of a resole-type phenolic resin under a high pressure of about 10–50 Kgs/cm$^2$.

Densified wood impregnated with phenolic resins is known and is used for electric insulation boards, handles of knives, door knobs, etc. However, since the phenolic resins used for these purposes generally do not easily permeate into wood tissues, densified wood has been manufactured by slicing wood into veneers of 1–2 mm in thickness and putting the veneers into the impregnation tank of an impregnator, and after evacuating the air of the tank, feeding the phenolic resin into the tank and impregnating the veneers with the phenolic resin from the sliced faces under vacuum, or further impregnating the veneers with the phenolic resin for a short time under a pressure of 0–5 Kgs/cm$^2$, then taking out the impregnated veneers from the tank and removing the excessive resin on the surfaces of the veneers, pre-drying the veneers at a temperature of 80°–100° C, and after piling up the veneers in 10–50 layers, hot-pressing the veneers at a temperature of 130°–200° C under a pressure of 20–100 Kgs/cm$^2$ for 20–100 minutes, and followed by finishing.

The aforementioned conventional method for manufacturing such densified wood, is defective in that the yield of the densified wood product from the raw timber is low because of the necessity to slice the wood into veneers before impregnation. Wood resources are now gradually decreasing, and especially the domestic broadleaved tree resources such as birch, beech, maple, etc. which have dense textures and beautiful grains, and which are most suitable as raw materials for phenolic resin-impregnated densified wood preparation are being exhausted markedly. Accordingly, increasing the yield of the densified wood product from the raw timber is highly desirable. To achieve this purpose, it is desirable that blocks of raw timber be impregnated with phenolic resins without previous slicing of the wood into veneer. However with the conventional impregnating techniques mentioned above, phenolic resin cannot penetrate deeply into the unsliced wood blocks.

SUMMARY OF THE INVENTION

The purpose of the present invention is to provide an improved method for making densified wood. This is achieved according to the invention by impregnating wood e.g. wood blocks, with a resole-type phenolic resin pre-condensate solution mixed, i.e. diluted, with an organic solvent such as methanol or acetone. Wood impregnation by the present mixtures proceeds from the cross-sectional faces of the blocks deep into the center thereof, facilitated by the good permeability of the phenolic resin pre-condensate into the wood vessels.

DETAILED DESCRIPTION OF THE INVENTION

The phenolic resins used in the present invention are phenol-formaldehyde condensates generally designated as resole-type phenolic resins, which include resins which, in the precondensate stage, are alcohol-soluble, i.e. soluble in the alcohol but insoluble in water, and water-soluble, i.e. soluble in both the alcohol and water. The impregnating of a block wood with phenolic resin is greatly affected by the properties and states of the resin.

More particularly, the important factors controlling the impregnation of wood with phenolic resins are:

(1) the molecular weight of the pre-condensate of the phenolic resins, (2) the affinity of the pre-condensate of the phenolic resin for the wood, (3) the viscosity of the solution of the phenolic resin pre-condensate, and (4) the type and amount of the solvent contained in phenolic resin solution and used for dilution.

First, the lower the molecular weight of the pre-condensate of the phenolic resin, the smaller will be the flow resistance in the fine vessels of the wood block during the impregnation and the better is the result of impregnation. The pre-condensate of the resole-type phenolic resin generally has a molecular weight of 100 to 500 and is superior in impregnating ability to novolac-type phenolic resin whose molecular weight is generally in the range of 100 to 1200.

Second, the higher the affinity of the phenolic resin pre-condensate towards the wood, the better will be the fixed state of the resin inside the wood tissue during the subsequent drying process. At this point, the pre-condensate of the resole-type phenolic resin contains more methylol groups than the pre-condensate of the novolak-type phenolic resin and, in consequence, exhibits a higher affinity to the cellulose that constitutes the wood tissue and thus gives a more outstanding product.

Next, with respect to viscosity, the lower the viscosity of the impregnating solution, the better will be the permeability of the resin solution into the wood. Therefore, when the viscosity of the resin solution is high, it is desirable to dilute the phenolic resin solution with a solvent, and thereby lower the viscosity of the solution. However, as the solvent use for this purpose must be evaporated when the impregnated wood is dried by heating, an optimal degree of dilution is determined by both the rate of permeation and the efficiency of evaporation. Therefore, the type and amount of the solvent contained in the phenolic resin pre-condensate solution or used as diluting agent are the most important factors of all when impregnation of the block wood with the solution is performed under a high pressure of 10–50 Kgs/cm$^2$. It is particularly important that the permeation rates of both the phenolic resin pre-condensate and the solvent be as near to each other as possible in order to ensure deep impregnation of the pre-condensate of phenolic resin into the wood block. If the permeation rate of the phenolic resin pre-condensate differs to a great extent from that of the solvent, selective adsorption of them by the wood may occur so that complete impregnation of the interior of the wood blocks with the phenolic resin pre-condensate becomes impossible. However, as the molecular weight of the phenolic resin pre-condensate is generally higher than that of the solvent, the rate of permeation into the inside of wood block of the phenolic resin pre-condensate is generally lower than that of the solvent. So, in order to make the permeation rates of the phenolic resin pre-condensate approximate that of the solvent as closely as possible, a variety of solvents have been tested by the present inventors. As a result, it was found that wood blocks impregnated with a very high content of the phenolic resin could be obtained by the use of a phenolic resin solution prepared from about 100 parts by weight of the phenolic resin solids and about 60 to about 400 parts by weight of methanol, acetone, or a mixture of methanol and acetone.

After wood blocks have been impregnated with the pre-condensate of the phenolic resin in an impregnating tank under pressure, they may be directly transferred to a dryer, dried and heated to obtain a densified wood. However, when the wood blocks are of small size, the densified wood block is advantageously obtained by hot-pressing a mass of piled blocks which have been impregnated according to the invention.

In order to describe the present invention more concretely, several examples are presented below, although it should be understood that these examples do not restrict the scope of the present invention. Parts and percentages cited in the examples and claims are by weight and unless otherwise noted.

EXAMPLE 1

Twenty pieces of block sapwood of beech, 300 cm in length, 30 cm in width and 5 cm in thickness, were dried to a moisture content of less than 15% and charged to an impregnation tank of an impregnation apparatus. Meanwhile, an impregnating solution was prepared by mixing 100 parts by weight of water-soluble resole-type phenolic resin (formaldehyde/phenol = 1.5 (mole ratio); catalyst, caustic soda; solid content of the resin, 50%; water content, 50%) with 150 parts by weight of methanol. Then, the impregnation tank charged with the beech blocks was deaerated for 1 hour under vacuum of 70–76 cm Hg. The above impregnating solution was charged to the tank. The impregnation of the blocks with the impregnating solution was carried out for 12 hours under a pressure of 30 Kgs/cm². Subsequently, the beech blocks were discharged from the tank, and excess impregnating solution on the wood surfaces was removed. The blocks were air-dried for 2 days, then charged to a dryer and heated for 12 hours at a temperature of 120°–130° C to evaporate the water and methanol and to fix and then cure the pre-condensate of the phenolic resin inside the wood. After cooling, the blocks were finished to obtain a densified wood. For comparison with respect to the phenolic resin content and bending strength of the densified wood, comparable blocks impregnated with water-soluble resole-type phenolic resin in absence of methanol under a pressure of either 5 Kgs/cm² or 30 Kgs/cm² were prepared. The results are shown in Table 1.

Table I

|  | The densified wood according to Example 1 | The densified wood impregnated with water-soluble resole-type phenolic resin solution which was not mixed with methanol, under a pressure of 5 Kgs/cm² (Comparative example) | The densified wood impregnated with water-soluble resole-type phenolic resin solution which was not mixed with methanol under a pressure of 30 Kgs/cm² (Comparative example) |
|---|---|---|---|
| Phenolic resin content of the wood (%) | 40 | 3 | 15 |
| Bending strength of the densified wood (Kgs/cm²) | 1800 | 1000 | 1400 |

EXAMPLE 2

Ten blocks of cedar, 400 cm in length, 40 cm in width and 20 cm in thickness, which had been dried to a moisture content of less than 15% were charged to an impregnation tank of the impregnator. Meanwhile, an impregnating solution was prepared by mixing 100 parts by weight of water-soluble resole-type phenolic resin (formaldehyde/phenol = 1.7; catalyst, caustic soda; solid content of the resin 45%; water content 55%) with 50 parts by weight of methanol. The impregnation tank charged with cedar blocks was then deaerated for an hour at a vacuum of 70–76 cm Hg, the impregnating solution mentioned above was charged and the impregnation of the blocks with the impregnating solution was carried out for 10 hours under a pressure of 10 Kgs/cm². Subsequently, the cedar blocks were discharged from the tank, and the excess impregnating solution on the wood surfaces was removed. The blocks were air-dried for 2 days, and charged to a dryer and heated for 15 hours at a temperature of 120°–130° C to evaporate the water and methanol and to fix and cure the pre-condensate of the phenolic resin inside the wood. After cooling, the blocks were finished to obtain a densified wood product. The phenolic resin content and bending strength of the densified wood impregnated according to the above process, were compared to those of comparable blocks prepared by impregnation with the water-soluble resole-type phenolic resins in absence of the methanol under a pressure of either 3 Kgs/cm² or 10 Kgs/cm². The results are shown in Table 2.

Table 2

| | The densified wood according to Example 2 | The densified wood impregnated with water-soluble phenolic resin solution that was not mixed with methanol, under a pressure of 3 Kgs/cm². (Comparative example) | The densified wood impregnated with water-soluble phenolic resin solution that was not mixed with methanol, under a pressure of 10 Kgs/cm². (Comparative example) |
|---|---|---|---|
| Phenolic resin content of the wood (%) | 38 | 8 | 15 |
| Bending strength of the densified wood (Kgs/cm²) | 1200 | 650 | 850 |

EXAMPLE 3

Thirty blocks of birch, 200 cm in length, 4 cm in thickness and 30 cm in width, which had been dried to a moisture content of less than 15%, were charged to an impregnation tank of the impregnator. Meanwhile, an impregnating solution was prepared by mixing 100 parts by weight of alcohol-soluble resole-type phenolic resin (formaldehyde/phenol = 1.1; catalyst, ammonia; solid content of the resin, 65%; water, 15%; methanol 10%; and acetone, 5%) with 20 parts by weight of methanol and 20 parts by weight of acetone. The impregnation tank charged with the birch blocks was then deaerated for about 1 hour at a vacuum of 70–76 cm Hg, the impregnating solution described above was charged and the impregnation of the wood blocks with the solution was carried out for 12 hours under a pressure of 50 Kgs/cm². Subsequently, the birch blocks were discharged from the tank, and the excess impregnating solution on the wood surfaces was removed. The birch blocks were air-dried for 2 days, and charged to a dryer and heated for 12 hours at a temperature of 120°–130° C to evaporate the water, methanol and acetone and to fix and cure the pre-condensate of the phenolic resin inside the wood. After cooling, the blocks were finished to obtain a densified wood product.

The phenolic resin content and bending strength of densified wood impregnated according to the above process were compared to those of comparable blocks prepared by impregnation with the alcohol-soluble resole-type phenolic resin solution with methanol and acetone under a pressure of 5 Kgs/cm², both in the absence and presence of the added methanol-acetone mixture. The results are shown in Table 3.

Table 3

| | The densified wood according to Example 3 | The densified wood impregnated with alcohol-soluble phenolic resin solution that was not mixed with additional methanol and acetone, under a pressure of 5 Kgs/cm². | The densified wood impregnated with alcohol-soluble phenolic resin solution that was mixed with additional methanol and acetone, under a pressure of 5 Kgs/cm² |
|---|---|---|---|
| Phenolic resin content in wood (%) | 30 | 3 | 18 |
| Bending strength of the densified wood (Kgs/cm²) | 2400 | 1200 | 1800 |

It is to be understood that the invention is not limited to the specific examples which have been offered merely as illustrative of the invention and that modifications can be made therein without departing from the spirit of the invention.

What is claimed is:

1. In the process of preparing a densified wood product wherein wood is contacted with a resole phenol-formaldehyde resin solution to impregnate the wood with said resin solution and thereafter is dried and then heated to fix and cure the resin in the wood, said solution comprising a condensate of phenol and formaldehyde, the improvement which comprises impregnating the wood under a pressure of about 10 to about 50 Kgs/cm² with said resin solution in the presence of about 0.6 to about 4 parts by weight of an organic liquid selected from the group consisting of methanol, acetone, and mixtures thereof per part by weight of the solids content of said resin solution whereby the bending strength of the wood product is increased and the cured phenolic resin content of the wood product is enhanced.

2. Process of claim 1 wherein the wood is block, raw timber dried to a moisture content of less than 15 percent by weight.

3. Process of claim 2 wherein said wood is selected from the group maple, beech, cedar and birch.

4. Process of claim 3 wherein the resin of the resin solution is selected from water-soluble resins and alcohol-soluble resins, said resins being condensates of phenol and formaldehyde in a mole ratio of about 1.1 to about 1.7, and the dried resin - impregnated wood is heated at 120°–130° C.

5. Process of claim 4 wherein the organic liquid is methanol, and the resin is a water-soluble resin.

6. Process of claim 5 wherein the wood is beech and the impregnation is carried out under a pressure of about 30 Kgs/cm$^2$ employing about 3 parts by weight of methanol per part by weight of the solids content of resin solution wherein the resin is a caustic soda-catalyzed condensation product of phenol and formaldehyde, the solids content is about 50 weight percent, and the water content is about 50 weight percent.

7. The process of claim 5 wherein the wood is cedar and the impregnation is carried out under a pressure of about 10 Kgs/cm$^2$ employing about 1.1 parts by weight of methanol per part by weight of the solids content of resin solution wherein the resin is a caustic soda-catalyzed condensation product of phenol and formaldehyde, the solids content is about 45 weight percent and the water content is about 55 weight percent.

8. The process of claim 4 wherein the organic liquid is a mixture of methanol and acetone and the resin is an alcohol-soluble resin.

9. The process of claim 8 wherein the wood is birch and the impregnation is carried out under a pressure of about 50 Kgs/cm$^2$ employing about 0.6 parts by weight of a mixture of equal weight proportions of methanol and acetone per part by weight of the solids content of resin solution wherein the resin is an ammonia-catalyzed condensation product of phenol and formaldehyde and the resin solution contains about 65 weight percent solids, about 15 weight percent water, about 10 weight percent methanol and about 5 weight percent acetone.

10. The densified wood product prepared by the process of claim 1.

* * * * *